(12) United States Patent
Watkins

(10) Patent No.: US 6,362,883 B1
(45) Date of Patent: Mar. 26, 2002

(54) METHOD AND DEVICE FOR ALIGNING SUBSTRATES IN FLAT PANEL DISPLAYS

(75) Inventor: Charles Martin Watkins, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 731 days.

(21) Appl. No.: 08/535,685

(22) Filed: Sep. 28, 1995

(51) Int. Cl.[7] .............................................. G01B 11/00
(52) U.S. Cl. ...................... 356/399; 356/400; 356/401; 250/548
(58) Field of Search ................................. 356/399, 400, 356/401; 250/548

(56) References Cited

U.S. PATENT DOCUMENTS 4,904,087 A * 2/1990 Harvey et al. .............. 356/400
5,337,151 A * 8/1994 Baxter et al. ............... 356/401

* cited by examiner

Primary Examiner—Frank G. Font
Assistant Examiner—Layla Lauchman
(74) Attorney, Agent, or Firm—Hale and Dorr LLP

(57) ABSTRACT

According to one embodiment of the invention, there is provided a method of aligning substrates in an apparatus for bonding a flat panel display device having a plurality of substrates, the method for aligning the substrates involving the steps of providing an optical path through each substrate, wherein alignment of the optical paths corresponds a desired alignment of the substrates. In another aspect, the invention involves the steps of directing a light into the optical path of a first substrate and detecting the light exiting the optical path of a second substrate and positioning the substrates relative to each other such that the amount of detected light is optimized.

11 Claims, 7 Drawing Sheets

FIELD EMISSION DISPLAY
CROSS SECTION

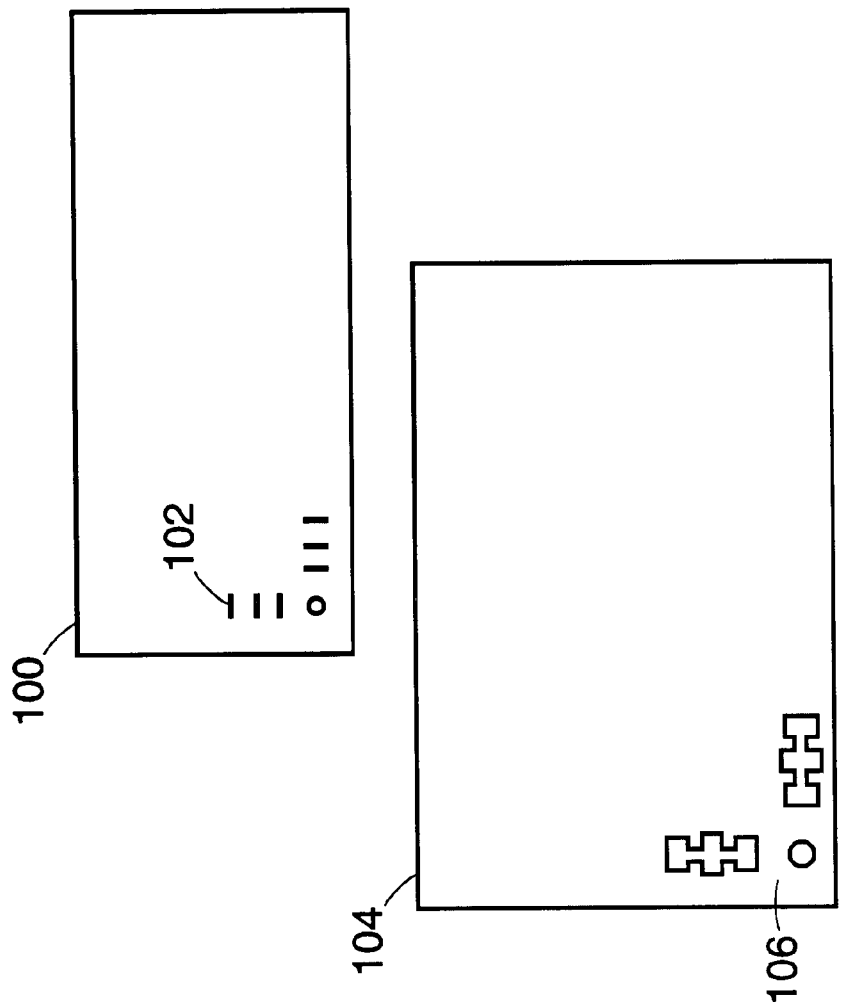

METHOD AND DEVICE FOR ALIGNING SUBSTRATES IN FLAT PANEL DISPLAYS

BACKGROUND OF THE INVENTION

This invention relates to the field of electronic displays, and, more particularly, flat panel displays, and even more particularly, field emission display ("FED") devices.

As technology for producing small, portable electronic devices progresses, so does the need for electronic displays which are small, provide good resolution, and consume small amounts of power in order to provide extended battery operation. Past displays have been constructed based upon cathode ray tube ("CRT") or liquid crystal display ("LCD") technology. However, neither of these technologies is perfectly suited to the demands of current electronic devices.

CRT's have excellent display characteristics, such as, color, brightness, contrast and resolution. However, they are also large, bulky and consume power at rates which are incompatible with extended battery operation of current portable computers.

LCD displays consume relatively little power and are thin in size. However, by comparison with CRT technology, they provide poor contrast, and only limited ranges of viewing angles are possible. Further, color versions of LCDs also tend to consume power at a rate which is incompatible with extended battery operation.

As a result of the above described deficiencies of CRT and LCD technology, efforts are underway to develop new types of electronic displays for the latest electronic devices. One technology currently being developed is known as "field emission display technology." The basic construction of a field emission display, or ("FED") is shown in FIG. 1. As seen in the figure, a field emission display, also referred to as a "flat panel display," comprises a faceplate 100 with a transparent conductor 102 formed thereon. Phosphor dots 112 are then formed on the transparent conductor 102. The faceplate 100 of the FED is separated from a baseplate 114 by a spacer 104. The plates 100 and 104 are also referred to as substrates. The spacers serve to prevent the baseplate from being pushed into contact with the faceplate by atmospheric pressure when the space between the baseplate and the faceplate is evacuated. A plurality of emitters 106 are formed on the baseplate. The emitters 106 are constructed by thin film processes common to the semi-conductor industry. Numerous emitters 106 are formed on the baseplate 114 to provide a spatially uniform source of electrons.

During manufacturing, a seal is formed around the outer boundaries of the faceplate 100 and the baseplate 114 to contain the evacuated space between them. Before this seal can be formed, it is important that the faceplate 100 is accurately aligned with the baseplate 114 in order to produce an acceptable flat panel display. In order to obtain the necessary alignment, corresponding alignment marks are often placed on the faceplate 100 and the baseplate 114. Optical equipment for detecting these alignment marks is then used to ensure that the plates are properly aligned. FIG. 1B shows an example of such alignment marks. As shown, substrate 100 is patterned with alignment marks 102. Substrate 100 may be either a faceplate or a baseplate. Substrate 104 is provided with alignment marks 106 which correspond to alignment marks 102 on substrate 100. As the substrates are assembled, optical equipment is used to simultaneously observe alignment marks 106 and 102 to ensure proper alignment of the substrates.

However, this technique is not completely satisfactory. In order for the optical equipment to ensure that the substrates are properly aligned, the equipment must be able to accurately focus on the edges of alignment marks 102 and 106. Further, the optical equipment must be able to focus on alignment marks 102 and 106 simultaneously as the substrates are being aligned. Such accurate focusing of the optical equipment is difficult due to the relatively large spacing between the substrates in a flat panel display. Moreover, the problem is compounded because, as the magnifying power of the optics is increased to provide an accurate image of the alignment marks, the depth of focus is correspondingly decreased thus making it even more difficult to focus on both substrates simultaneously. For example, for a flat panel display having a 500 micron gap between substrates 100 and 106, there are no optics presently available which would provide a micron (order of magnitude) accuracy. Further still, optics capable of producing an acceptable alignment are expensive and add to the overall cost of the manufacture of the flat panel display.

Accordingly, there is a need in the art for a method and apparatus of aligning flat panel displays which will overcome the above-mentioned problems.

SUMMARY OF THE INVENTION

According to an aspect of the present invention, there is provided a method of aligning substrates in an apparatus for aligning a flat panel display having a plurality of substrates. Although the following discussion often focuses on field emissions displays, it is to be understood that the present invention also has application with other flat panel displays such as LCDs and plasma displays. In one embodiment, the method for aligning the substrates comprises providing an optical path through each substrate, wherein alignment of the optical paths corresponds a desired alignment of the substrates. In another aspect, the invention comprises directing a light into the optical path of a first substrate, detecting the light exiting the optical path of a second substrate and positioning the substrates relative to each other such that the amount of detected light is optimized.

According to another embodiment of the invention, there is provided an apparatus for aligning a plurality of substrates in a field emission display, each substrate having a path allowing for the passage of light, the paths being disposed such that alignment of the paths corresponds to a desired alignment of the substrates. In one version, the apparatus has a source which directs a light into the optical path of a first substrate, a detector of the light exiting the optical path of a second substrate, and a positioner which determines the amount of light detected and positions the substrates relative to each other such that the amount of detected light is optimized.

BRIEF DESCRIPTION OF THE DRAWINGS

For a more complete understanding of the invention and for further advantages thereof, reference is made to the following Detailed Description taken in conjunction with the accompanying drawings, in which:

FIG. 1B is a top view showing the alignment marks on a substrate.

It is to be noted, however, that the appended drawings illustrate only typical embodiments of this invention and are therefore not to be considered limiting of its scope, for the invention may admit to other equally effective embodiments.

DETAILED DESCRIPTION OF EMBODIMENTS OF THE INVENTION

Figure 1A:
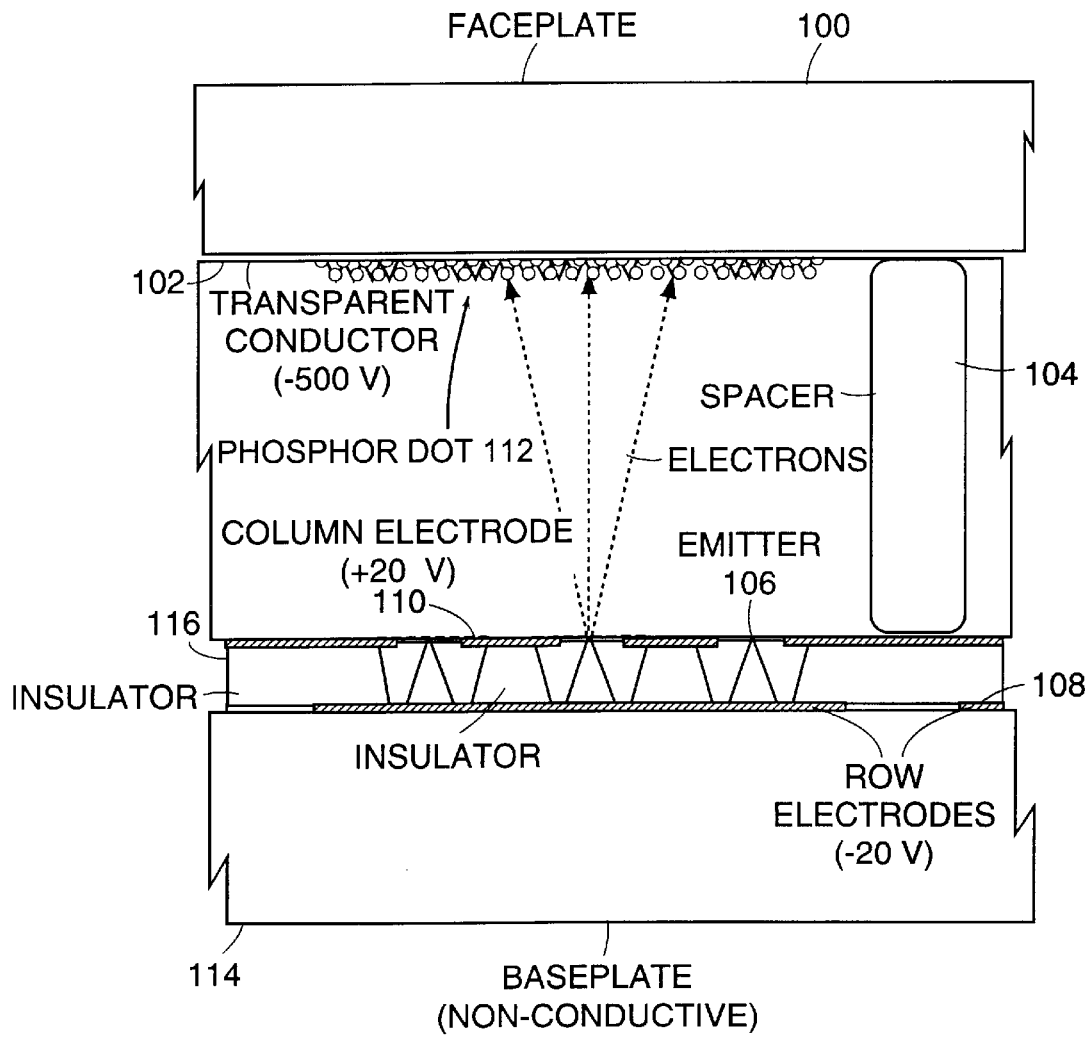
FIG. 1A is a cross-sectional view of a typical field emission display device.
Figure 2:
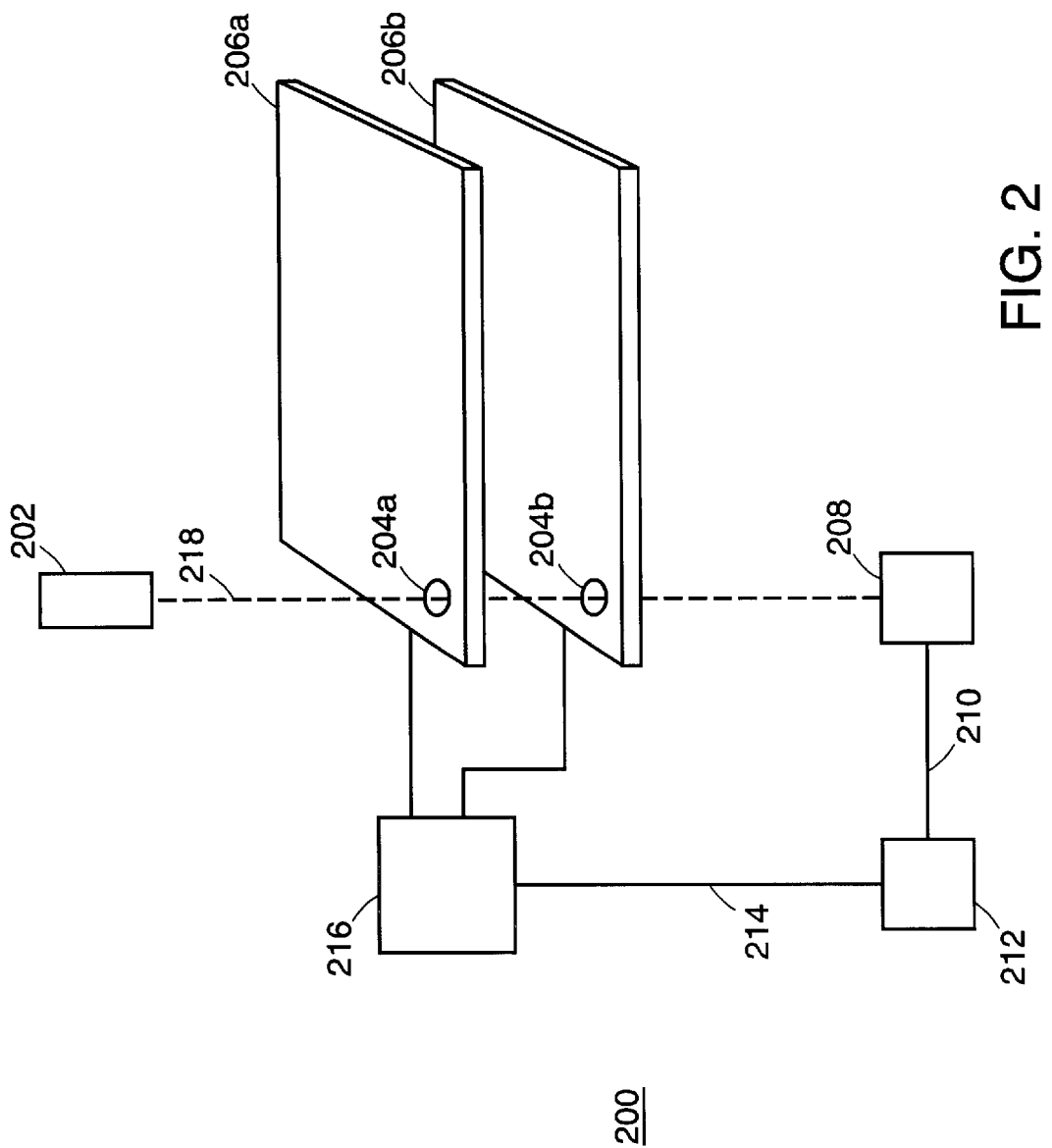
FIG. 2 is a block diagram of an alignment apparatus conforming to an embodiment of the invention.

Referring now to FIG. 2, there is provided, according to one embodiment of the invention, an apparatus 200 for aligning a plurality of substrates 206a and 206b, each substrate having a path 204a and 204b allowing for the passage of light 218, the paths 204a and 204b being disposed such that alignment of the paths 204a and 204b corresponds to a desired alignment of the substrates 206a and 206b. In one version, the apparatus 200 has a source 202 which directs a light 218 into the optical path 204a of a first substrate 206a, a detector 208 of the light 218 exiting the optical path 204b of a second substrate 206b, and a positioner 216 which determines the amount of light detected and positions the substrates 206a and 206b relative to each other such that the amount of detected light is optimized.

In another version of the invention, the positioner 216 further comprises a determiner 212 of the amount of light detected at detector 208. Detector 208 provides a signal 210 to determiner 212 which, after determining how much light is received at detector 208, sends a signal 214 to positioner 216 which controls the relative position of the substrates 206a and 206b. It will be understood by those of skill in the art that other arrangements of the positioner 216, determiner 212 and detector 208 are possible provided that the position of the substrate is controlled by the amount of light received at the detector 208. Of course, it is understood by those of skill in the art that the term light includes wavelengths in the visible, ultra-violet, and infrared spectrums, as well as other wavelengths.

According to another aspect of the invention, the source 202 is a collimated source. Examples of collimated light sources known to be useful with the present invention are tungsten illuminators, such as manufactured by Leica, which deliver, for example, 600 foot candles of collimated illumination. Often, such illuminators have an aperture to reduce the spot size.

Collimated sources are particularly useful with the invention because they have little beam divergence so alignment spots are well defined. This aspect is further described with respect to FIG. 5.

Figure 5:
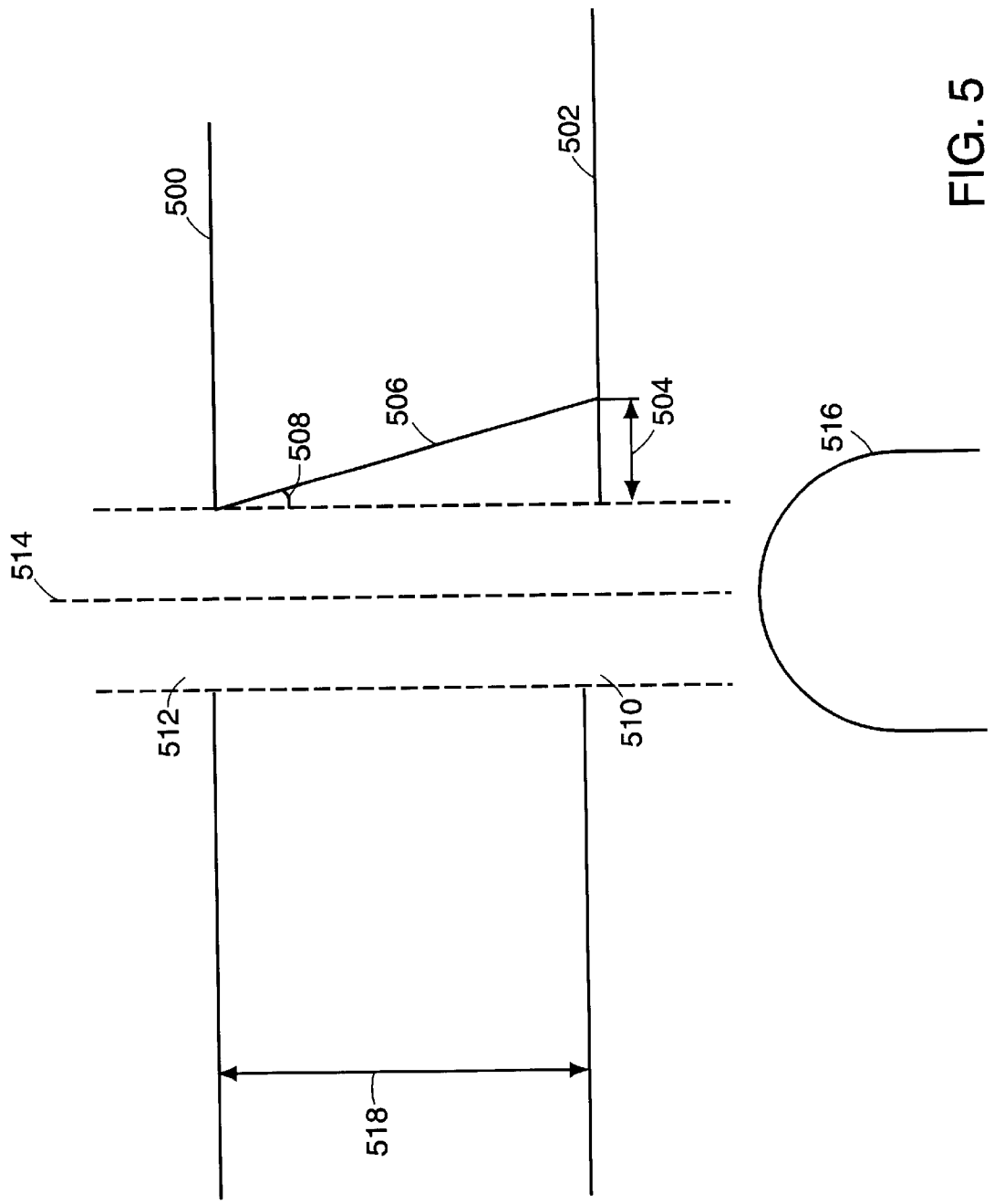
FIG. 5 is a diagram showing beam divergence of a device according to an embodiment of the invention.

FIG. 5 shows the effect of beam divergence. A light beam 514 is passed through an aperture 512 of a first substrate 500 and detected by detector 516 after the beam 514 exits an aperture 510 on a second substrate 502. The beam diverges an a half angle 508. This results an error 504 which limits the possible resolution. It is possible to calculate the necessary collimation of the illumination source. For example, if an alignment accuracy of 2 microns is desired in a device having the first substrate 500 spaced 0.020 inches from the second substrate 502 then half angle 508 is determined by the arctangent of the error 504 divided by the gap 518. In the above example, the half angle 508 is determined to be about 0.5 degrees.

According to one aspect of the invention, the detector 208 is a photodetector. Examples of photodetectors known to be useful with the present invention are the LM-3 manufactured by Coherent which can be used with the LABMASTER measurement system, also manufactured by Coherent. Other examples of acceptable photodetectors will occur to those skilled in the art who will recognize that various types of are used as long as they are responsive to the frequency of light emitted from the source 202. In one embodiment, a photodetector is provided in which the resistance of the photodetector changes in response to the amount of light is receives. Alternately, the photodetector supplies a voltage responsive to the amount of light received. In still another embodiment of the invention, the photodetector is a phototransistor which passes an amount of current responsive to the amount of light detected.

According to another aspect of the invention, the detector 208 is a CCD camera. The CCD camera used is not critical as long as it has the required resolution and response to the light source.

Figure 2A:
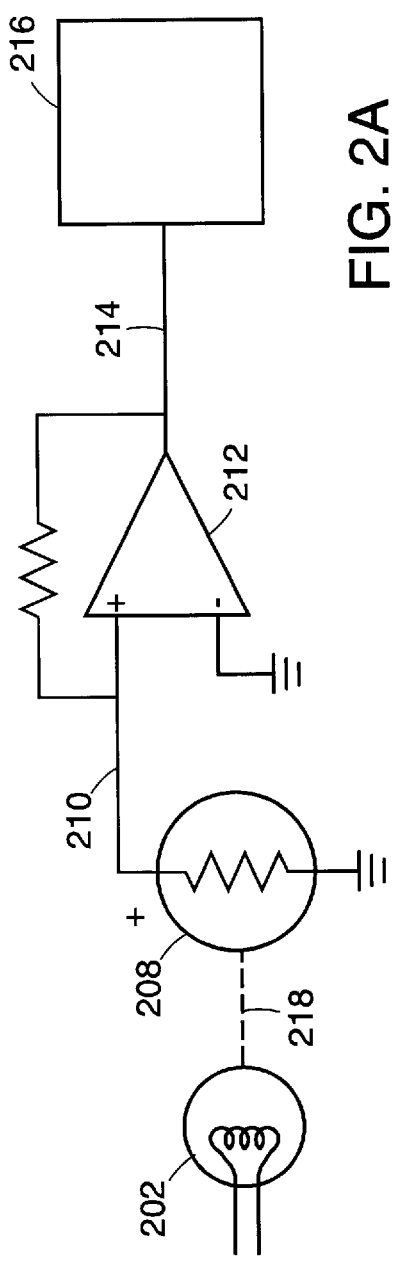
FIG. 2A is a schematic diagram of a circuit according to an embodiment of the invention.

FIG. 2A is a schematic diagram according to an embodiment of the invention wherein the positioner 216 comprises an analog circuit which determines the amount of light detected. According to the FIG. 2A in the embodiment, there is provided a photodetector 208 which provides a signal 210 to determiner 212. Signal 210 is responsive to the amount of light 218 received from source 202. Determiner 212 includes an amplifier which provides signal 214 to positioner 216. Positioner 216 then positions substrates 206 (not shown).

Figure 2B:
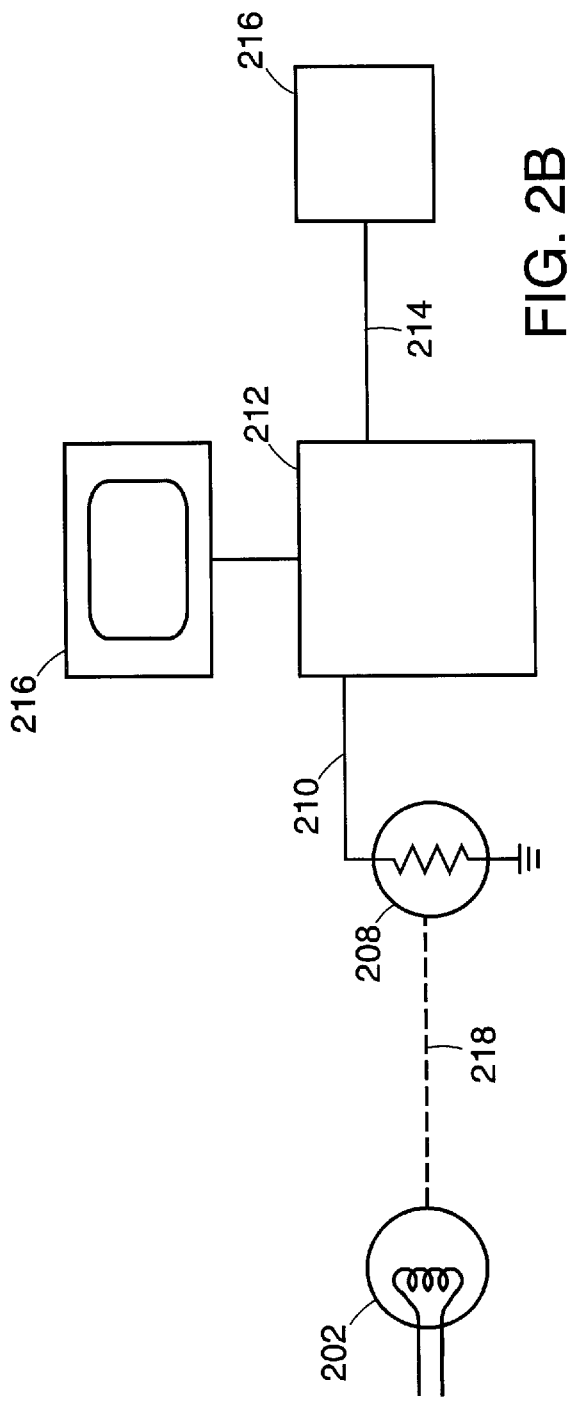
FIG. 2B is a schematic diagram of a computer system according to an embodiment of the invention.

FIG. 2B shows another embodiment of the invention wherein photodetector 208 provides a signal 210 responsive to the amount of light 218 received from source 202 to determiner 212, which according to this embodiment, comprises a digital computer having a display 216. The computer 212 runs an algorithm which analyzes the signal 210, which is representative of the amount of light received at photodetector 208, and provides a signal 214 to positioner 216.

Referring again to FIG. 2, there is provided a method of aligning substrates 206a and 206b in an apparatus for aligning a plurality of substrates in a field emission display, the method comprising providing an optical path 204a, 204b, through each substrate 206a, 206b, wherein alignment of the optical paths 204a, 204b, corresponds a desired alignment of the substrates 206a, 206b. In another aspect, the invention comprises directing a light 218 into the optical path 204a of a first substrate 206a and detecting the light exiting the optical path 204b of a second substrate 206b and positioning the substrates 206a, 206b, relative to each other such that the amount of detected light is optimized. In one embodiment of the invention, optimizing the amount of detected light comprises maximizing the light passing through the substrates 206a, 206b. Alternately, optimizing the amount of detected light comprises minimizing the light passing through the substrates 206a, 206b.

Figure 3:
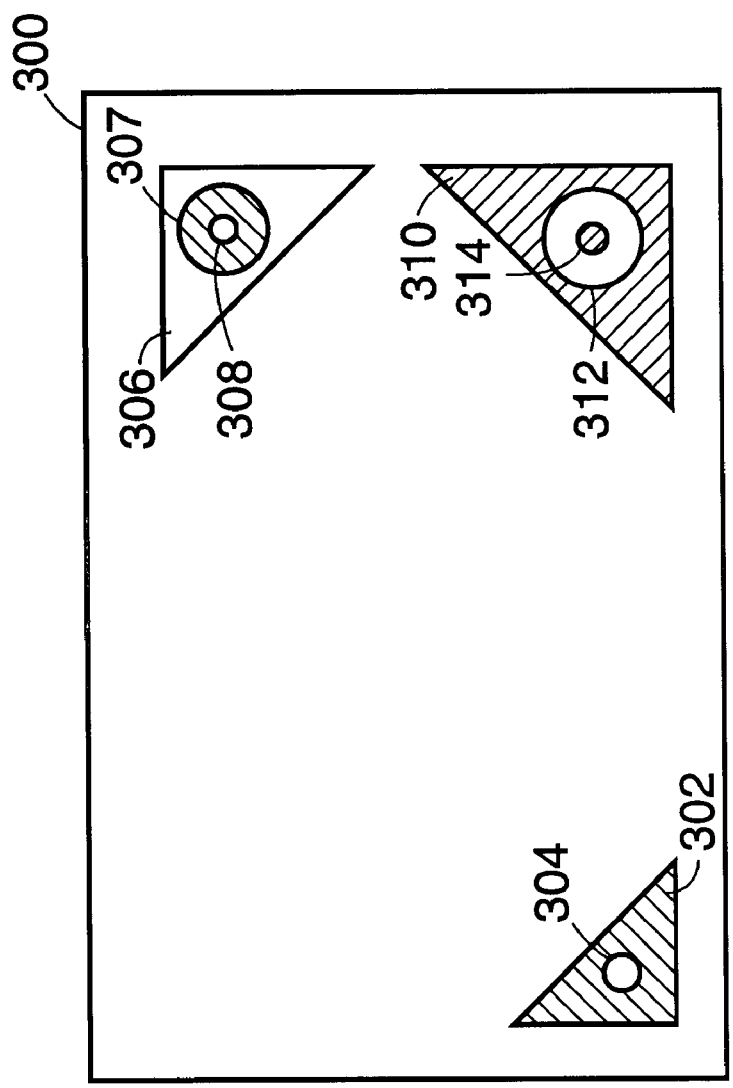
FIG. 3 is a top view of a substrate according to an embodiment of the invention.

FIG. 3 shows an example of the invention in which the step of providing an optical path comprises disposing an opaque film on a substrate and then etching away a portion of the film. As shown in FIG. 3, different patterns may be formed by etching away the opaque film to leave the desired optical path. In one example, opaque film 306 is etched away to leave a darkened opaque area 307 with an interior transparent area 308. In another example, opaque film 310 is etched away to leave an opaque area 314 and a transparent area 312. In still a further example, opaque area 302 is etched away to provide transparent area 304. An example of an opaque film known to be useful with the present invention is chrome. Another example of an opaque film would be aluminum. Other suitable opaque films will occur to those of skill in the art.

Similarly, various etching procedures may be used to etch away the opaque film to leave the desired optical path. For example, one acceptable etching technique would be etching with CR-14, a commercially available chrome etchant.

In another embodiment, the providing an optical path comprises disposing an opaque film on a first portion of the substrate, thereby creating an optical path in a second portion of the substrate. This is performed, for example, by using a mask having the desired optical path pattern.

Figure 4B:
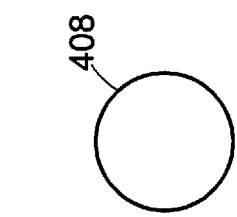
FIGS. 4A–4D are plan views showing alignment methods according to an embodiment of the invention.

FIGS. 4A–4D show how corresponding optical paths could be used to properly align the substrates by optimizing, i.e., either maximizing or minimizing the light passing through the substrates. For example, in FIG. 4A substrate 408 has an optical path 404 for transmitting light. Substrate 402 has optical path 406 which also transmits light. When the substrates 400, 402 are not perfectly aligned, the amount of light transmitted to the detector (not shown) will be proportional to the area 408 which represents the inner section between optical paths 406 and 404. When the substrates 400, 402 are positioned such that they are properly aligned, the amount of light passing through inner section 408 will be maximized as shown in FIG. 4B.

Figure 4D:
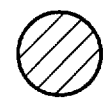
Figure 4A:
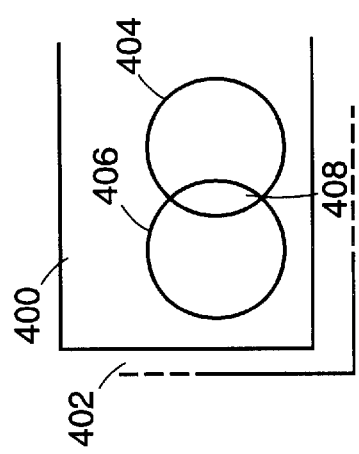
Figure 4C:
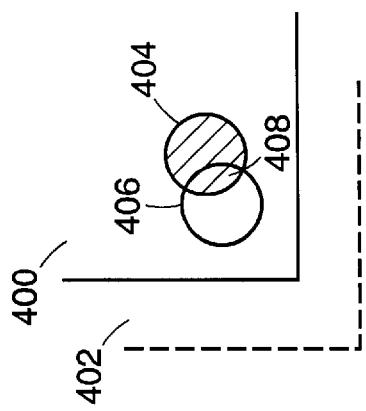

FIGS. 4C–4D show another embodiment of the invention in which substrate 402 is provided with optical path 406 which corresponds to opaque area 404 on substrate 400. As shown, when the substrates are improperly aligned, the amount of light received at the detector (not shown) will be proportional to the area of optical path 406 which is not covered by opaque 404. In this embodiment, the positioner (not shown) seeks to minimize the amount of light received. When the substrate 400, 402 are properly aligned, opaque area 404 completely blocks optical path 406 such that substantially no light is received at the detector.

What is claimed is:

1. A method for forming a flat panel display, the method comprising steps of:

forming an optical path through a first substrate of the flat panel display, the first substrate being part of one of an anode and a cathode of the display;

forming an optical path through a second substrate of the flat panel display, the second substrate being part of the other of the anode and the cathode of the display;

introducing light through the optical path of the first substrates;

detecting light exiting the optical path of a second substrate;

positioning the substrates relative to each other such that the amount of detected light is optimized; and sealing together the first and second substrates after the positioning step with the relative positions determined by the positioning step.

2. The method of claim 1, wherein the flat panel display is a field emission display, wherein one of the forming steps includes forming a path through a substrate having a transparent dielectric layer and a transparent conductive layer over the transparent dielectric layer.

3. The method of claim 1, wherein one of the forming steps includes forming a metallic layer over the respective substrate and removing a portion of the metallic layer.

4. The method of claim 3, wherein the step of forming a metallic layer includes forming an aluminum layer.

5. The method of claim 3, wherein the step of forming a metallic layer includes forming a chrome layer.

6. The method of claim 3, wherein the removing step includes removing a single circular portion of the metallic layer to produce a circular aperture.

7. The method of claim 3, wherein the removing step includes removing a single annular portion of the metallic layer to produce an annular aperture.

8. The method of claim 3, wherein the removing step includes removing all but a circular portion of the metallic layer and removing a portion from within the circular portion to produce a circular aperture.

9. The method of claim 1, wherein the sealing step includes sealing together the substrates with spacers therebetween extending from the first substrate to the second substrate.

10. A flat panel display made according to the method of claim 1.

11. The flat panel display of claim 10, wherein the flat panel display is a field emission display, wherein one of the substrates in an anode having a transparent dielectric layer and a transparent conductive layer over the transparent dielectric layer.

* * * * *